US012511334B2

(12) United States Patent
Agarwal et al.

(10) Patent No.: US 12,511,334 B2
(45) Date of Patent: Dec. 30, 2025

(54) SYSTEMS AND METHODS FOR SECURE DOCUMENT TRANSFER

(71) Applicant: Better Holdco, Inc., New York, NY (US)

(72) Inventors: Suman Agarwal, Jersey City, NJ (US); Daniel Alexander Golant, Brooklyn, NY (US); David Y. Hu, San Francisco, CA (US)

(73) Assignee: Better Holdco, Inc., New York, NY (US)

( * ) Notice: Subject to any disclaimer, the term of this patent is extended or adjusted under 35 U.S.C. 154(b) by 507 days.

(21) Appl. No.: 17/722,024

(22) Filed: Apr. 15, 2022

(65) Prior Publication Data

US 2023/0334100 A1   Oct. 19, 2023

(51) Int. Cl.
*G06F 16/93* (2019.01)
*G06F 21/55* (2013.01)
*G06F 21/62* (2013.01)

(52) U.S. Cl.
CPC ............ *G06F 16/93* (2019.01); *G06F 21/554* (2013.01); *G06F 21/6209* (2013.01)

(58) Field of Classification Search
CPC .... G06F 16/93; G06F 21/554; G06F 21/6209; H04L 9/088
See application file for complete search history.

(56) References Cited

U.S. PATENT DOCUMENTS

| | | | |
|---|---|---|---|
| 6,463,418 B1* | 10/2002 | Todd | G06Q 30/06 705/52 |
| 8,572,388 B2* | 10/2013 | Boemker | G06Q 10/10 713/168 |
| 9,176,942 B1* | 11/2015 | McLaughlin | G06F 40/166 |
| 10,810,361 B1* | 10/2020 | Venkatraman | H04L 63/0421 |
| 11,080,790 B2* | 8/2021 | Keefer | G06Q 40/08 |
| 11,900,491 B2* | 2/2024 | Gibson | G06F 40/169 |
| 2006/0206622 A1* | 9/2006 | Noble | G06F 16/258 707/999.2 |
| 2014/0095133 A1* | 4/2014 | Silva | G06Q 10/20 703/7 |
| 2019/0052467 A1* | 2/2019 | Bettger | H04L 9/0643 |
| 2020/0380505 A1* | 12/2020 | Shah | H04L 9/321 |
| 2022/0245201 A1* | 8/2022 | Ashlock | G06F 21/10 |
| 2022/0405352 A1* | 12/2022 | Such Vicente | G06F 21/10 |
| 2023/0185610 A1* | 6/2023 | Bast | G06F 9/466 718/104 |

(Continued)

FOREIGN PATENT DOCUMENTS

KR    20070007411 A * 1/2007 .......... G06Q 50/167

*Primary Examiner* — Lynn D Feild
*Assistant Examiner* — Abdullah Almamun (57) ABSTRACT

Aspects of the present disclosure relate to secure document transfer. Secure document transfer may be automatically performed once an event date is obtained. Documents may be automatically generated based on the event date and subsequently stored in a document platform. An electronic message may next be automatically generated to include contact information determined according to the recipient information of a recipient associated with the event, an indication of the set of documents, and a set of event instructions determined based on the event type. The electronic message may then be automatically transmitted to the recipient.

20 Claims, 5 Drawing Sheets

(56) References Cited

U.S. PATENT DOCUMENTS

| | | | | |
|---|---|---|---|---|
| 2023/0315978 A1* | 10/2023 | Garrido | ............... | G06F 40/169 715/234 |
| 2023/0342166 A1* | 10/2023 | DeNeui | ................. | G06F 9/451 |

* cited by examiner

SYSTEMS AND METHODS FOR SECURE DOCUMENT TRANSFER

BACKGROUND

Document generation and transfer are operations that may suffer from human errors as well as delays. For example, an operator may generate documents incorrectly, enter the wrong recipient information, transfer documents insecurely, include incorrect instructions for the recipient, and transmitting information too late.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to secure document transfer. Secure document transfer may be automatically performed once an event date is obtained. Documents may be automatically generated based on the event date and subsequently stored in a document platform. An electronic message may next be automatically generated to include contact information determined according to the recipient information of a recipient associated with the event, an indication of the set of documents, and a set of event instructions determined based on the event type. The electronic message may then be automatically transmitted to the recipient.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present disclosure relate to transferring a document securely and efficiently. A traditional document transfer may involve a first party (e.g., a closer of a loan) manually inputting a recipient contact information (e.g., email address), manually inputting event instructions (e.g., closing of a home purchase), manually generating and attaching documents (e.g., closing package containing loan documents), and transmitting an electronic message (e.g., an email) to the corresponding recipient with the event instructions and documents manually input by the operator. Such traditional document transfer may be slow, prone to human errors, and insecure. Systems and methods of the present disclosure overcome the abovementioned issues of the traditional document transfer by identifying one or more events for which a secure document transfer should occur, configuring a secure document transfer process, and automatically generating or facilitating the generation of an electronic communication with which to perform a secure document transfer. Thus, as a result of the presently disclosed aspects, minimal to no operator input is needed for the correct documents to be generated and transferred to the correct recipient.

Aspects of the present disclosure relate to automatically transmitting an electronic message including automatically determined recipient information, instructions, and documents. In some examples, the transmission of the electronic message may be initiated by obtaining an event date (e.g., closing date or transaction completion deadline) associated with an event of an event type (e.g., closing a home purchase or completing a transfer of one or more resources). Specifically, upon obtaining the event date, various embodiments of the present disclosure may automatically determine the contact information of an appropriate recipient (e.g., a settlement agent of a home purchase process), automatically determine event instructions based on the event type and/or the event date, automatically generate and/or determine event documents based on the event type and/or the event date. In certain examples, parts of the event documents and/or event instructions such as deadlines may be automatically determined based on the event date.

As another example, the transmission of the electronic message may be initiated by obtaining any information update to an event participant's information (e.g., a loan borrower) and/or to an event property's information (e.g., tax scheme associated with a real property). Specifically, upon obtaining the information update, various embodiments of the present disclosure may automatically determine the contact information of an appropriate recipient (e.g., a settlement agent of a home purchase process), automatically determine event instructions based on the information update, automatically generate and/or determine event documents based on and/or the information update. In certain examples, parts of the event documents and/or event instructions such as deadlines may be automatically determined based on the information update.

In various examples, an operator may input information to override or supplement the automatically determined information. For example, an operator may modify the automatically determined recipient contact information, such as to include addition recipients. As another example, an operator may modify the automatically determined event instructions, such as to delete, add, or replace one or more event instructions. As a further example, an operator may modify the automatically determined documents, such as to delete, add, or replace a document from the set of automatically determined documents. In various examples, the electronic message may include links for accessing and/or downloading the event documents or the event documents as attachments to the electronic message. In certain examples, the electronic message may be automatically transmitted to the recipient or manually transmitted upon instruction of the operator (e.g., by completing a system activity for document transfer).

Aspects of the present disclosure relate to obtaining an event date and storing the event date on a memory store. Upon obtaining the event date, systems for secure document transfer may initiate an activity for the system or an operator to complete. Specifically, to complete the activity, recipient information, event instructions, and event documents need to be determined. In various examples, such determinations may be automatically determined, with optional operator-intervention. In some examples, automatic determination of recipient information, event instructions, and/or event documents may include auto-populating such information in the electronic message. In certain examples, event instructions may instruct the recipient to complete one or more events, such as a timeline to follow, documents to execute, event participants (e.g., buyer, seller, title agent, real estate agent, and/or loan agent) and how to securely return executed documents.

Aspects of the present disclosure relate to encrypting event documents before being transmitted to the recipient. For example, event documents may be encrypted after (e.g., closely after) they are generated such that encrypted documents are stored in a document store. In other examples, event documents may be encrypted before (e.g., closely before) being transmitted to the recipient. In some examples, document encryption transmission, and/or storage may be performed by an external or third-party device or service. In various examples, event documents may be encrypted according to encryption protocols set to ensure secure document transfer. As an example, event documents may be encrypted to be accessible upon verification (e.g., only upon verification) by the determined recipient. As another example, event documents may be encrypted to be accessible within (e.g., only within) a pre-determined time window. In some examples, event documents may be encrypted and stored in a secure document platform (e.g., a document folder on the cloud). In certain examples, access may be revoked upon a certain times (e.g., one time) of access.

Aspects of the present disclosure relate to automatically generating and transmitting an updated electronic message. For example, upon obtaining an updated event date, updated documents and/or updated event instructions may be automatically generated and transmitted along with an updated electronic message to a recipient. In various examples, each time updated information, such as event date, is updated, the secure document transfer process is automatically performed, with little to no operator intervention. While examples are discussed in the context of an updated event date, aspects of the present disclosure can be performed in response to any of a variety of other events (e.g., a change in escrows, a change in closing fees, a change to taxes, or an update an address, etc.) or according to a schedule, among other examples.

Figure 1:
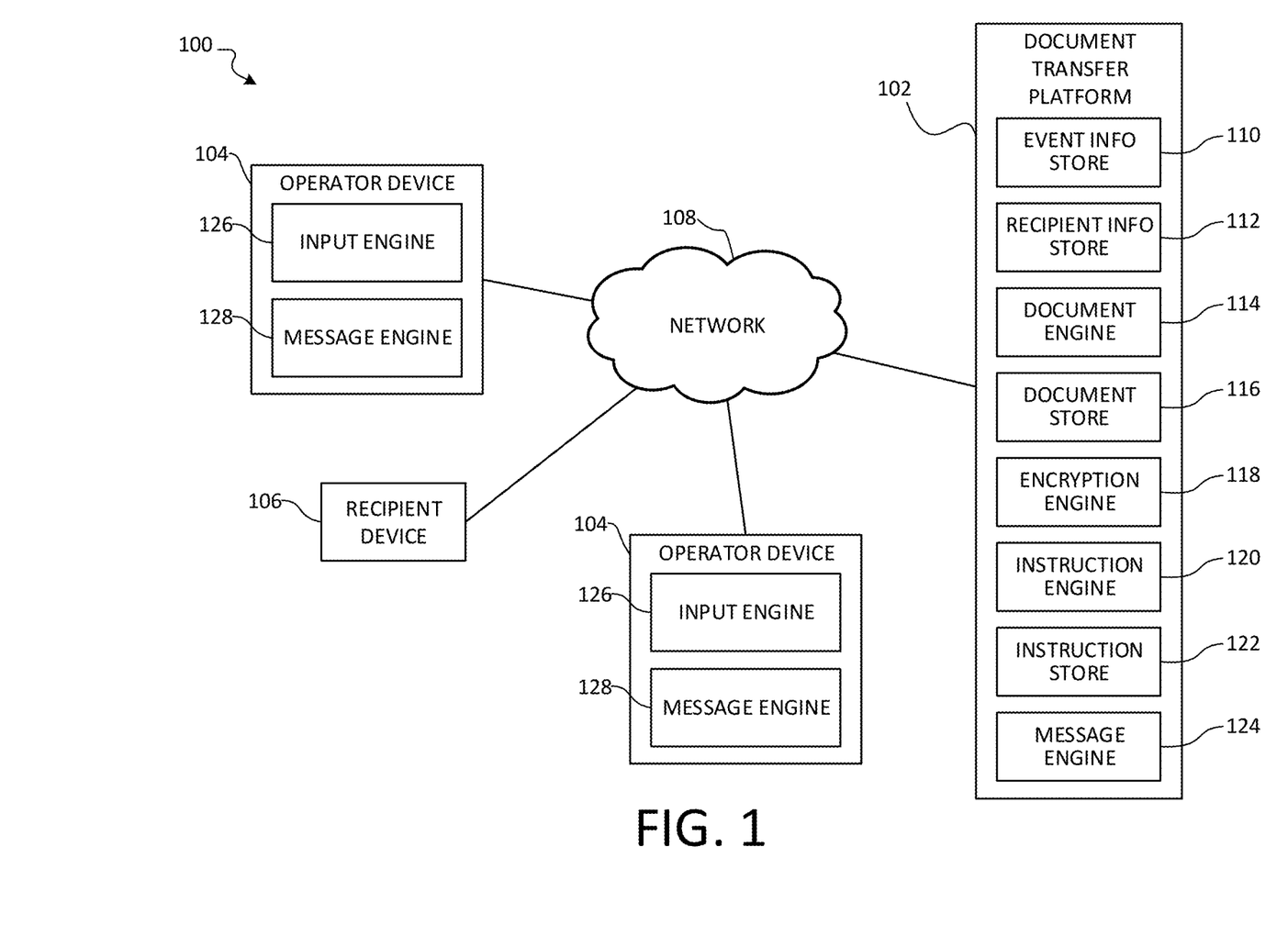
FIG. 1 illustrates a simplified view of an example system for secure document transfer according to aspects described herein.

FIG. 1 illustrates an overview of an example system 100 for the secure document transfer techniques described herein. As illustrated, system 100 comprises document transfer platform 102, operator device 104, recipient device 106, and network 108. In various examples, document transfer platform 102, operator device 104, recipient device 106 communicate via network 108. For example, network 108 may comprise a local area network, a wireless network, or the Internet, or any combination thereof, among other examples.

Document transfer platform 102, operator device 104, and recipient device 106 may each be any of a variety of computing devices. For example, document transfer platform 102, operator device 104, and recipient device 106 may each be a distributed computing device comprised of a set of computing devices that provide the functionality described herein. As another example, document transfer platform 102, operator device 104, and recipient device 106 may each be a mobile computing device, a laptop computing device, a tablet computing device, a desktop computing device, and/or a server computing device, among other examples.

It will be appreciated that while system 100 is illustrated as comprising one document transfer platform 102, two operator devices 104, and one recipient device 106, any number of such elements may be used in other examples. Further, the functionality described herein may be distributed among or otherwise implemented on any number of different computing devices in any of a variety of other configurations in other examples.

As depicted, document transfer platform 102 may include event information store 110, recipient information store 112, document engine 114, document store 116, encryption engine 118, instruction engine 120, instruction store 122, and message engine 124. In various examples, document transfer platform 102 may be configured to communicate with operator device 104 and/or recipient device 106, such as via network 108. Specifically, document transfer platform 102 may obtain event information such as an event date from operator device 104 and/or recipient device 106. Further, document transfer platform 102 may generate and transmit electronic messages to recipient device 106. The electronic messages may include documents (e.g., as attachments, indications thereof, or links to access thereof), and instructions. In certain examples, the documents may be encrypted before being transmitted to recipient device 106.

Event information store 110 may be configured to obtain and store event information such as event date from operator device 104 and/or recipient device 106. In some examples, event information of multiple events may be stored simultaneously and configured to be recalled for document generation, instruction generation, and/or message generation.

Recipient information store 112 may be configured to obtain and store recipient information such as contact information (e.g., email address) from operator device 104 and/or recipient device 106. In some examples, recipient information may be associated with event information stored at event information store 110. For example, event information store 110 may include recipient labels (e.g., names) that are linked to additional recipient information stored at recipient information store 112.

Document engine 114 may be configured to generate event documents for the event. In various examples, document engine 114 may generate a set of documents based at least in part upon the event date, the event type, and/or additional event information (e.g., recipient information). For example, document engine 114 may generate a set of loan documents based on a closing date of a home purchase agreement closing meeting. Documents generated by document engine 114 may then be stored at document store 116, which may be an local to document transfer platform 102, as presently illustrated, or be a separate memory store in other examples.

Encryption engine 118 may encrypt the set of documents according to a set of encryption protocols, such as after the documents are generated by document engine 114 and before documents are stored at document store 116. The set of encryption protocols may include AES, such as AES-256-GCM. In certain examples, documents are encrypted before being transmitted out from document transfer platform. In various examples, documents may be encrypted such that the documents are accessible upon verification by the recipient. In various examples, documents may be encrypted such that documents are accessible within a pre-determined time window.

Instruction engine 120 may generate event instructions for the event. For example, event instructions may instruct the recipient to carry out the event, which may include a list of documents to be executed and returned. In some examples, the instructions may be generated based on the event date, event type, and/or additional event or recipient information. Instructions generated by instruction engine 120 may be stored at instruction store 122. In some examples, one or more instruction templates may be used to aid the generation of event instructions. For example, multiple instruction templates may be stored at instruction store 122 for different recipients, operators, and/or event types.

Message engine 124 may generate an electronic message including contact information determined according to recipient information stored in recipient information store 112. The electronic message may further include secured documents generated by document engine 114, encrypted by encryption engine 118, and stored at document store 116. Specifically, an electronic message may include indications of the documents, links for accessing and/or downloading the documents from the document store, and/or the documents as attachments. Further, the electronic message may include event instructions generated by instruction engine 118 and stored at instruction store 122. In various examples, message engine 124 may transmit the electronic message to the recipient and/or the operator. For example, message engine 124 may receive a transmission instruction from operator device 104 to initiate the transmission of the electronic message to recipient device 106.

As depicted, operator device 104 may include input engine 126 and message engine 128. Input engine 126 allows an operator to input recipient information, documents, and instructions. As an example, document transfer platform 102 may generate an information package according to aspects described herein, which may contain automatically determined recipient information, event documents, and event instructions to operator device 104 to allow an operator to modify (e.g., add, remove, or replace) any automatically determined recipient information, event documents, and event instructions.

The information package may be obtained by operator device 104, where it may be presented to an operator of operator device 104. User input may be received to add, remove, or modify aspects of the information package. In another example, the operator may approve the information package. Accordingly, message engine 128 may generate an operator-approved electronic message based on the information package and any supplemental or replacement recipient information, documents, and/or instructions (e.g., as may result from user input received from a user of operator device 104). Message engine 128 may transmit the operator-approved electronic message to recipient device 106. In examples, the operator-approved electronic message may be provided to document transfer platform 102 or to another device for transmission to operator device 104. In certain examples, message engine 128 may further transmit event date to document transfer platform 102. Alternatively, recipient device 106 may transmit the event date.

Figure 2A:
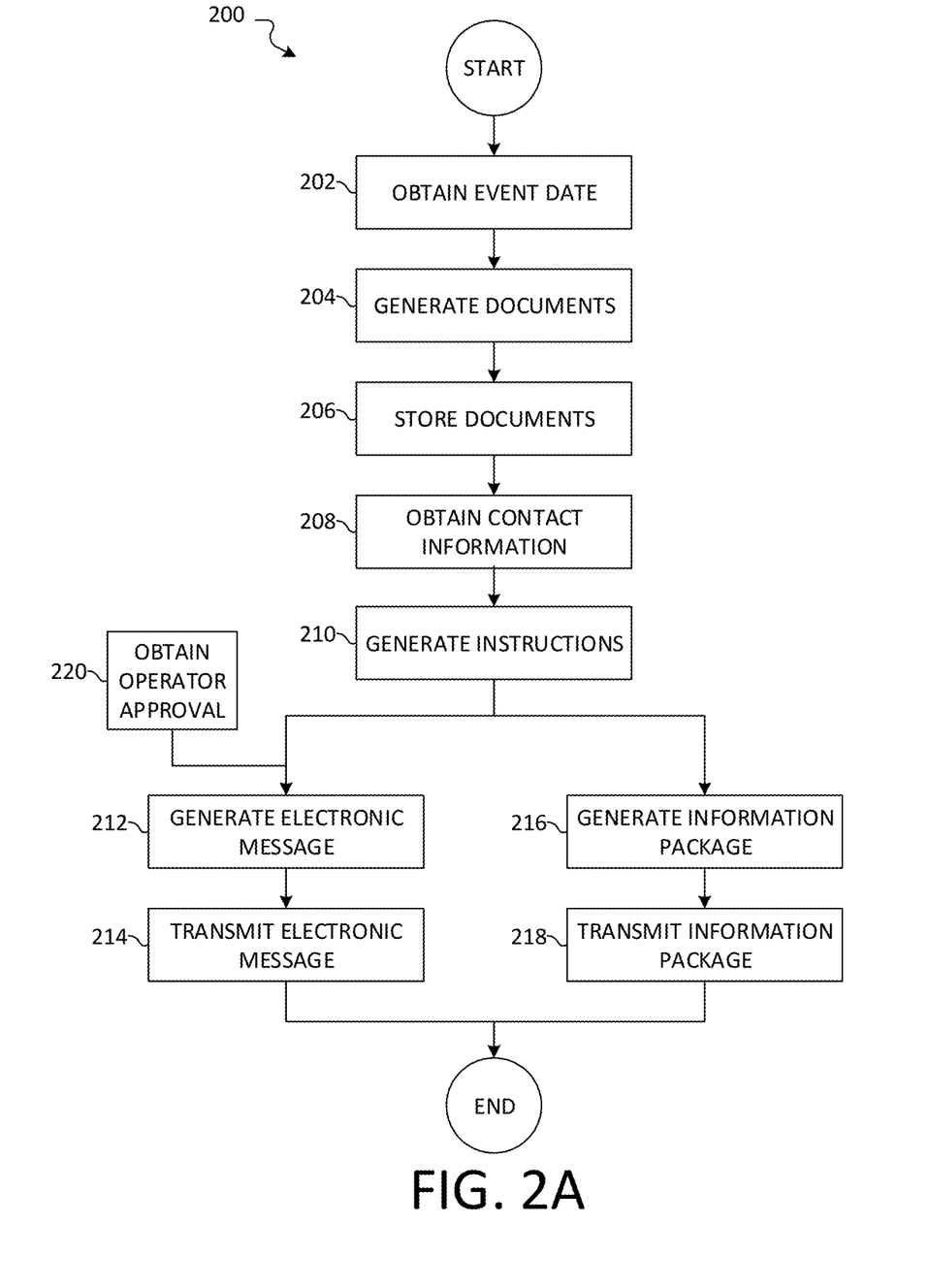
FIG. 2A illustrates a simplified view of an example method for secure document transfer according to aspects described herein.

FIG. 2A illustrates an overview of an example method 200 for secure document transfer. In various examples, aspects of method 200 are performed by a document transfer platform, such as document transfer platform 102 in FIG. 1.

Method 200 begins at operation 202, where an event date is obtained. An event date may be obtained from an operator device or from a recipient device. The event date may include date and time of an event, which may be a home purchase closing event. Additionally or alternatively, event information other than the event date may also trigger the remaining operations of method 200. For example, documents and/or instructions generated may be based on event information other than the event date in place of or in addition to the event date.

Flow next progresses to operation 204, where documents are generated. Documents may be generated based at least in part upon the event date, event type, recipient information, and/or additional event information. In some examples, documents may automatically be generated for transmission to a recipient. In various examples, documents may be generated based on a document template. For example, a set of document templates may be pre-generated according to one or more industry (e.g., the mortgage industry) standards including standard structures, formats, and/or styles. In some examples, a set of APIs may be used by an operator to generate documents based on document templates, such as by at least inputting event date, event type, recipient information, and/or additional event information.

Flow next progresses to operation 206, where the documents are stored. In various examples, documents may be stored at a secure document platform, such as a cloud storage server. In some examples, documents may be encrypted and stored at the secure document platform. As discussed above, documents may be encrypted according to a set of encryption protocols configured to achieve secure document transfer. As an example, documents may be encrypted such that the documents are accessible upon verification by the recipient. As another example, documents may be encrypted such that the documents are accessible within a pre-determined time window.

Flow next progresses to operation 208, where contact information is obtained for a recipient of the electronic message. Contact information for one or multiple recipients may be obtained automatically such that human-error may be reduced or avoided. For example, the contact information may include a recipient email address, a recipient phone number, a recipient mailing address, and/or any of a variety of other contact information associated with the recipients.

Flow next progresses to operation 210, where event instructions are generated. Event instructions may be generated based at least in part upon event date, event type, and/or additional event information. For example, event instructions may contain a timeline for the recipient to follow, and instructions for executing and/or returning of documents.

Flow may next progress to operation 212, where an electronic message is generated to include contact information determined according to the recipient information, a set of documents, and a set of event instructions. In some examples, the set of documents may be included as attachments, as links for accessing or downloading the documents from the secure document platform, or as indicators of the attachments. In some examples, operation 212 may occur as a result of obtaining operator approval of an information package containing the automatically generated recipient contact information, event documents, and event instructions. Examples of such aspects are discussed below with respect to operation 220 and method 250 of FIG. 2B.

Flow next progresses to operation 214, where the electronic message is transmitted to the recipient. As an example, the electronic message may be transmitted by a document transfer platform, such as document transfer platform 102, to a recipient device, such as recipient device 106. Such transmission may be automatic without an operator intervention. In other examples, transmission may be triggered in response to a transmission instruction, such as a transmission instruction from an operator device, such as operator device 104. In some examples, the electronic message may be displayed on the recipient device. Method 200 terminates after operation 214.

In another example, rather than progressing to operation 212, flow may instead progress from operation 210 to operation 216, where an information package is generated. In various examples, the information package may contain at least documents generated at operation 204, contact information obtained at operation 208, and/or instructions generated by operation 210.

Flow next progresses to operation 218, where the information package is transmitted to an operator device. In various examples, the information package may be transmitted via an application programming interface (API) to an operator device (e.g., operator device 104) to be reviewed by an operator. Method 200 terminates after operation 218.

As a further example, an operator may approve the information package in its entirety, approve the information package partially, reject the information package, or modify (e.g., add, delete, change, or replace) the information package. Examples of such aspects are discussed below with respect to method 250 of FIG. 2B. Once the information package is approved, with or without modification, an operator approval may be obtained at operation 220, where the flow progresses to operation 212, where electronic message is generated based on the operator-approved information package. Thus, an electronic message may be generated automatically (e.g., as a result of performing operations 210, 212, and 214), based at least in part on an indication received from an operator (e.g., as a result of performing operations 210, 216, 218, and 220, followed by 212 and 214), or a combination thereof.

Figure 2B:
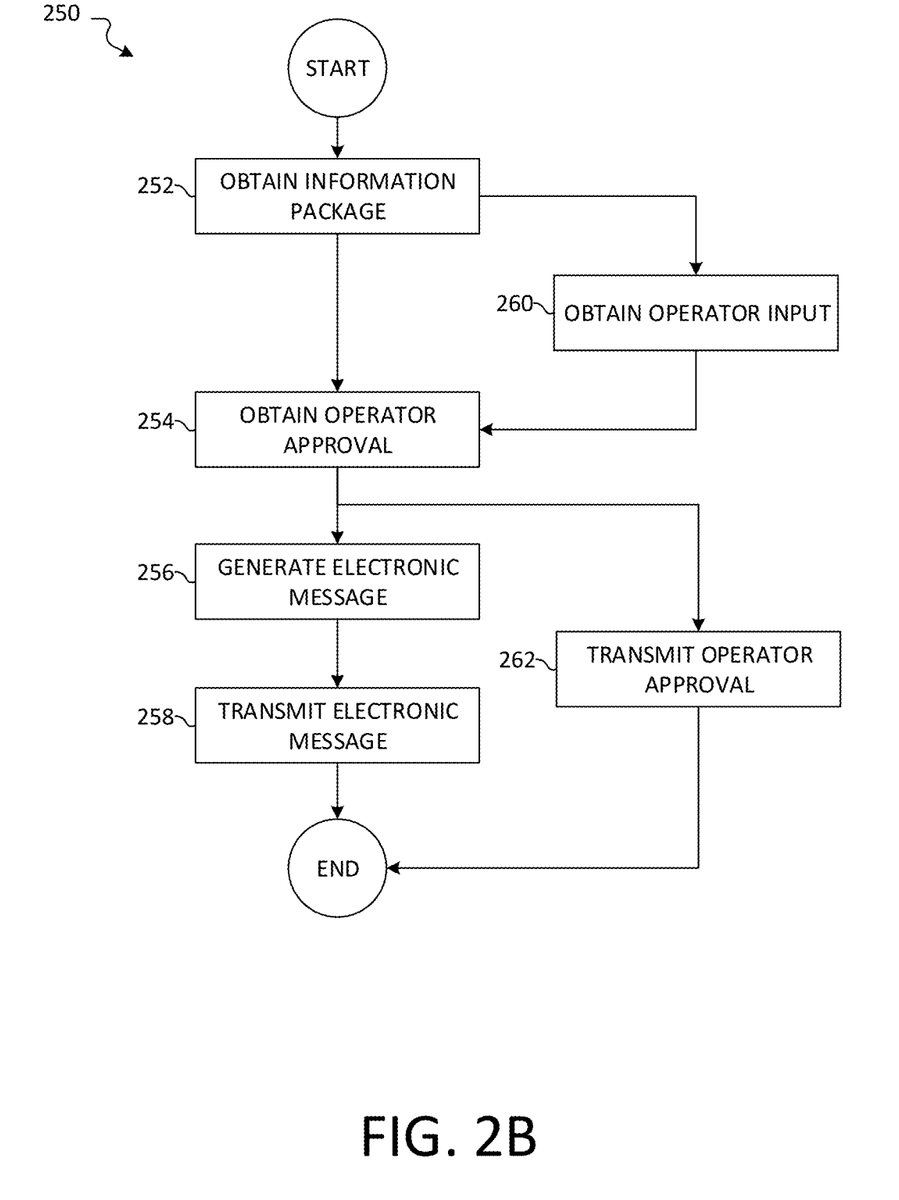
FIG. 2B illustrates a simplified view of an example method for secure document transfer according to aspects described herein.

FIG. 2B illustrates an overview of an example method 250 for secure document transfer. In various examples, aspects of method 250 are performed by an operator device, such as document operator device 104 in FIG. 1.

Method 250 begins at operation 252, where an information package is obtained. In various examples, the information package may be received from a document transfer platform, such as document transfer platform 102, to an operator device, such as operator device 104. The information package may include event documents, recipient contact information, and event instructions, such as those generated via method 200.

Flow next progresses to operation 254, where an operator approval is obtained. In various examples, an operator may review the information package and, if satisfactory, submit an operator approval to the operator device. In certain examples, operator input may be obtained at operation 260 prior to approving the information package. Specifically, operator input may include one or more modifications (e.g., addition, deletion, or replacement) to the information package obtained at operation 252 such that the operator-approved information package is the initial information package modified according to the one or more modifications.

Flow may next progress to operation 256, where an electronic message is generated to include the operator-approved information package containing operator-approved contact information, documents, and event instructions. In some examples, the set of documents may be included as attachments, as links for accessing or downloading the documents from the secure document platform, or as indicators of the attachments.

Flow next progresses to operation 258, where the electronic message is transmitted to the recipient. As an example, the electronic message may be transmitted by an operator device, such as operator device 104, to a recipient device, such as recipient device 106. As another example, the electronic message may be provided to another computing device (e.g., an email server or document transfer platform 102) for transmission to the recipient. Thus, in some examples, the electronic message may be displayed on the recipient device as a result of performing method 250. Method 250 terminates after operation 258.

Rather than progressing to operation 256, flow may instead progress to operation 262, where the operator approval is transmitted. Specifically, the operator approval may be transmitted by an operator device, such as operator device 104, to a document transfer platform, such as document transfer platform 102. For example, the operator approval may be received as part of operation 220 discussed above such that the operator approval may, once obtained, trigger operation 212, where an electronic message may be generated based on the operator-approved information package. Method 250 terminates after operation 260.

Figure 3:
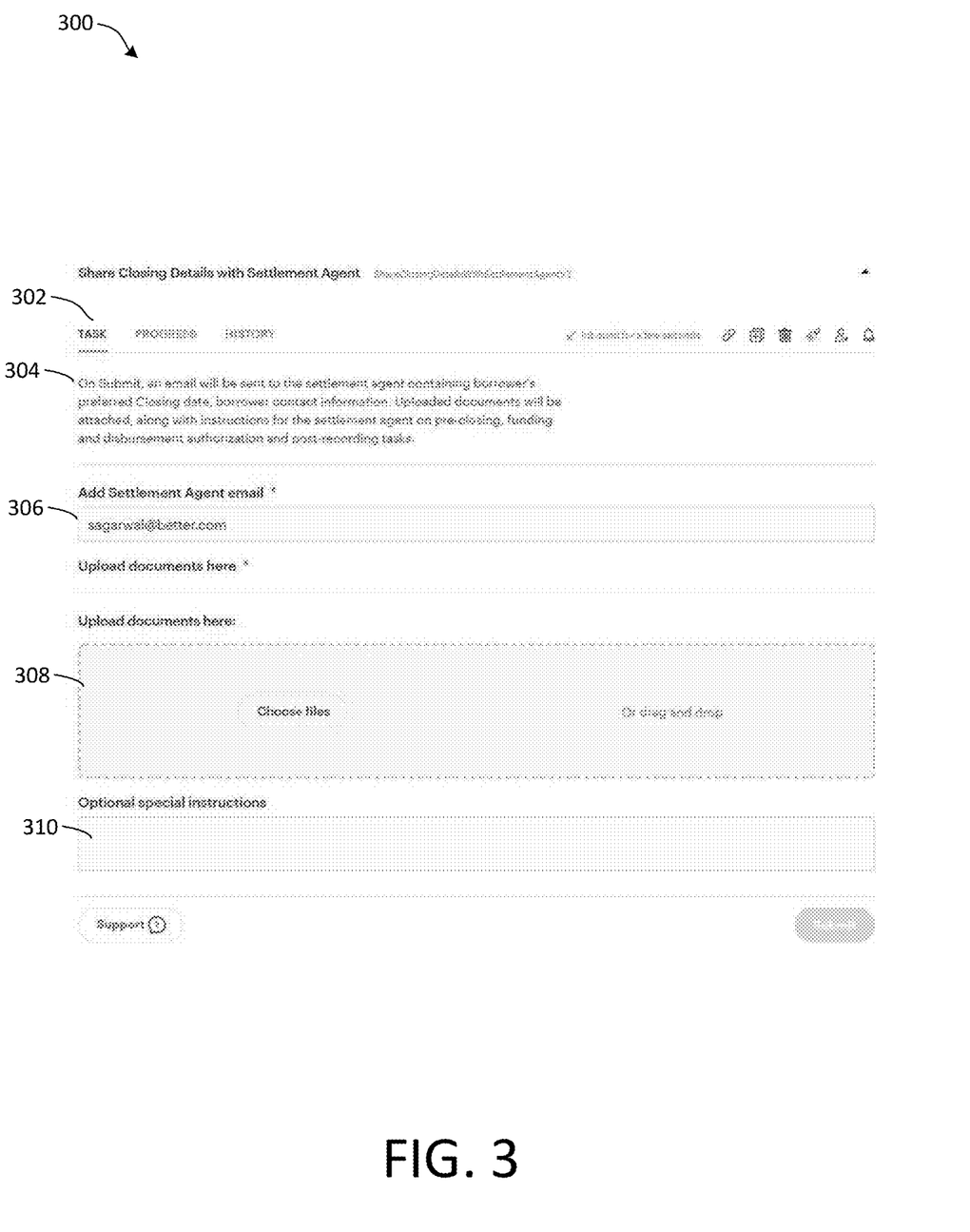
FIG. 3 illustrates a simplified view of an example user interface for secure document transfer according to aspects described herein.

FIG. 3 illustrates a simplified view of an example user interface 300 for a secure document transfer system according to aspects described herein. Such user interface aspects may be generated by a computing device. As illustrated, user interface 300 comprises function bar 302, task information section 304, recipient information section 306, document section 308, and instruction section 310.

User interface 300 may be provided to an operator (e.g., a loan officer) of an event (e.g., closing of a home purchase with a home loan) for the operator to review automatically determined recipient information (e.g., email address), event documents (e.g., loan documents), and/or event instructions (e.g., closing instructions). In examples, a template may be identified and pre-populated according to aspects described herein, for example as a result of a computing device performing aspects of method 200 discussed above with respect to FIG. 2A. The operator may modify recipient information, event documents, and/or event instructions before an operator-approved electronic message is transmitted to the recipient. In some examples, the operator-approved electronic message is sent after the operator clicks on the submit action button on user interface 300. As an example, the operator-approved electronic message may be sent as a result of the computing device at which the user interface is displayed performing aspects of method 250 discussed above with respect to FIG. 2B.

As shown, function bar 302 includes a task generation tab, a task progress tab, and a task history tab. User interface 300, as shown, corresponds to the task generating tab. As depicted, task information section 304 shows an explanation of the task generation process. Recipient information section 306 includes a textbox configured to show automatically determined recipient contact information (e.g., email address). Recipient information section 306 may further be configured for the operator to modify the recipient contact information.

Document section 308 includes an interactive document section configured to show automatically determined event documents (e.g., loan documents). Document section 308 may further be configured for the operator to modify the event documents, such as by replacing, adding, and/or removing documents to be sent to the recipient along with the electronic message. Instruction section 310 includes a textbox configured to show automatically determined event instructions (e.g., closing instructions). Instruction section 310 may further be configured for the operator to modify the event instructions, such as by replacing, adding, and/or removing instructions to be sent to the recipient as part of the electronic message. While example user interface aspects and associated user experience paradigms are provided, it will be appreciated that fewer, additional, or alternative user interface elements may be used to facilitate secure document transfer according to aspects described herein.

Figure 4:
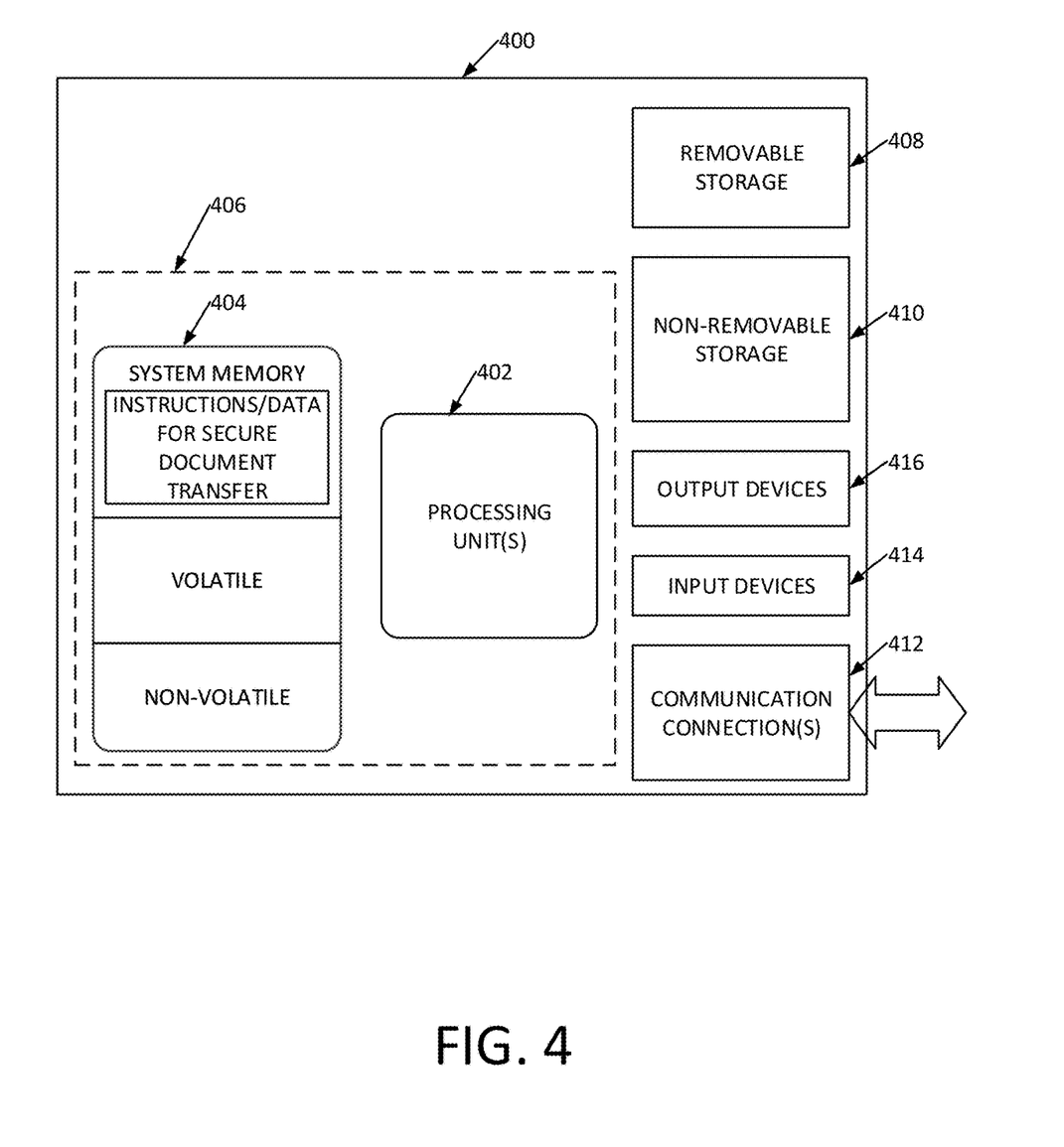
FIG. 4 illustrates a simplified view of an example operating environment in which one or more aspects of the present application may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most simplified configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most simplified configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable, and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIG. 2A and/or FIG. 2B, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system for secure document transfer comprising: a processor; and a memory storing instructions that, when executed by the processor, causes the system to perform a set of operations. The set of operations comprises: obtaining an event date associated with an event of an event type; generating a set of documents based at least in part upon the event date and the event type; storing the set of documents in a document platform; obtaining recipient information of a recipient associated with the event; generating a first electronic message including: contact information determined according to the recipient information, an indication of the set of documents, and a set of event instructions determined based at least in part upon the event type; and transmitting the first electronic message to the recipient. In an example, storing the set of documents comprises encrypting the set of documents according to a set of encryption protocols. In a further example, the set of documents is encrypted such that the set of documents is accessible upon verification by the recipient. In yet another example, the set of documents is encrypted such that the set of documents is accessible within a pre-determined time window. In still another example, the set of operations further comprises obtaining a set of supplemental documents from an event administrator; wherein the first electronic message further includes an indication of the set of supplemental documents. In another example, the set of operations further comprises obtaining a set of supplemental event instructions from an event administrator; wherein the first electronic message further includes the supplemental event instructions. In still another example, the set of operations further comprises: obtaining a revised event date associated with the event; generating a set of revised documents based at least in part upon the revised event date; storing the revised set of documents in the document platform; generating a second electronic message including: contact information determined according to the recipient information, an indication of the revised set of documents, and the set of event instructions; and transmitting the second electronic message to the recipient. In yet another example, the set of operations further comprises generating the set of event instructions based at least in part upon the event type and the event date. In still another example, transmitting the first electronic message to the recipient comprises obtaining a transmission instruction from an event administrator.

In another aspect, the technology relates to a method for secure document transfer. The method comprises: obtaining an event date associated with an event of an event type; generating a set of documents based at least in part upon the event date and the event type; storing the set of documents in a document platform; obtaining recipient information of a recipient associated with the event; generating a first electronic message including: contact information determined according to the recipient information, an indication of the set of documents, and a set of event instructions determined based at least in part upon the event type; and transmitting the first electronic message to the recipient. In an example, storing the set of documents comprises encrypting the set of documents according to a set of encryption protocols. In a further example, the set of documents is encrypted such that the set of documents is accessible upon verification by the recipient. In yet another example, the set of documents is encrypted such that the set of documents is accessible within a pre-determined time window. In still another example, the method further comprises obtaining a set of supplemental documents from an event administrator; wherein the first electronic message further includes an indication of the set of supplemental documents. In another example, the method further comprises obtaining a set of supplemental event instructions from an event administrator; wherein the first electronic message further includes the supplemental event instructions. In still another example, the method further comprises: obtaining a revised event date associated with the event; generating a set of revised documents based at least in part upon the revised event date; storing the revised set of documents in the document platform; generating a second electronic message including: contact information determined according to the recipient information, an indication of the revised set of documents, and the set of event instructions; and transmitting the second electronic message to the recipient. In yet another example, the method further comprises generating the set of event instructions based at least in part upon the event type and the event date. In still another example, transmitting the first electronic message to the recipient comprises obtaining a transmission instruction from an event administrator.

In a further aspect, the technology relates to a system for secure document transfer comprising: a processor; and a memory storing instructions that, when executed by the processor, causes the system to perform a set of operations. The set of operations comprises: obtaining an event date associated with an event of an event type; generating a set of documents based at least in part upon the event date and the event type; storing the set of documents in a document platform; obtaining recipient information of a recipient associated with the event; generating a first electronic message including: contact information determined according to the recipient information, a set of links for accessing the set of documents, and a set of event instructions determined based at least in part upon the event type; and transmitting the first electronic message to the recipient. In an example, storing the set of documents comprises encrypting the set of documents according to a set of encryption protocols. In a further example, the set of documents is encrypted such that the set of documents is accessible upon verification by the recipient. In yet another example, the set of documents is encrypted such that the set of documents is accessible within a pre-determined time window. In still another example, the set of operations further comprises obtaining a set of supplemental documents from an event administrator; wherein the first electronic message further includes a set of links for accessing the set of supplemental documents. In another example, the set of operations further comprises obtaining a set of supplemental event instructions from an event administrator; wherein the first electronic message further includes the supplemental event instructions. In still another example, the set of operations further comprises: obtaining a revised event date associated with the event; generating a set of revised documents based at least in part upon the revised event date; storing the revised set of documents in the document platform; generating a second electronic message including: contact information determined according to the recipient information, a set of links for accessing the revised set of documents, and the set of event instructions; and transmitting the second electronic message to the recipient. In yet another example, the set of operations further comprises generating the set of event instructions based at least in part upon the event type and the event date. In still another example, transmitting the first electronic message to the recipient comprises obtaining a transmission instruction from an event administrator.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for secure document transfer comprising:
a processor; and
a memory storing instructions that, when executed by the processor, causes the system to perform a set of operations, the set of operations comprising:
obtaining an event date associated with an event of an event type;
generating, as part of an information package for the event type, a set of documents based at least in part upon the event date and the event type;
storing the set of documents in a document platform;
obtaining recipient information of a recipient associated with the event;
including, as part of the information package:
contact information determined according to the recipient information, and
a set of event instructions determined based at least in part upon the event type;
prior to transmission of a first electronic message, causing display of at least a part of the information package at a computing device of an approver;
in response to receiving, via the computing device of the approver, a user indication to change the information package:
updating the information package according to the received user indication;
generating, based on the updated information package, the first electronic message, wherein the first electronic message comprises an indication of the set of documents; and
transmitting, to the recipient, the first electronic message; and
in response to receiving, via the computing device of the approver, an approval indication:
generating, based on the information package, the first electronic message, wherein the first electronic message comprises an indication of the set of documents; and
transmitting the first electronic message to the recipient.

2. The system of claim 1, wherein storing the set of documents comprises encrypting the set of documents according to a set of encryption protocols.

3. The system of claim 2, wherein the set of documents is encrypted such that the set of documents is accessible upon verification by the recipient.

4. The system of claim 2, wherein the set of documents is encrypted such that the set of documents is accessible within a pre-determined time window.

5. The system of claim 1, wherein the set of operations further comprises:
obtaining a set of supplemental documents from an event administrator;
wherein the first electronic message further includes an indication of the set of supplemental documents.

6. The system of claim 1, wherein the set of operations further comprises:
obtaining a set of supplemental event instructions from an event administrator;
wherein the first electronic message further includes the supplemental event instructions.

7. The system of claim 1, wherein the set of operations further comprises:
obtaining a revised event date associated with the event;
in response to obtaining the revised event date, generating a set of revised documents based at least in part upon the revised event date;
storing the revised set of documents in the document platform;
generating a second electronic message including:
contact information determined according to the recipient information,
an indication of the revised set of documents, and
the set of event instructions; and
transmitting the second electronic message to the recipient.

8. The system of claim 1, wherein the set of operations further comprises generating the set of event instructions based at least in part upon the event type and the event date.

9. The system of claim 1, wherein transmitting the first electronic message to the recipient comprises obtaining a transmission instruction from an event administrator.

10. A computer-implemented method for secure document transfer comprising:
obtaining an event date associated with an event of an event type;
generating, as part of an information package for the event type, a set of documents based at least in part upon the event date and the event type;
storing the set of documents in a document platform;
obtaining recipient information of a recipient associated with the event;
including, as part of the information package;
contact information determined according to the recipient information, and
a set of event instructions determined based at least in part upon the event type;
prior to transmission of a first electronic message:
causing display of at least a part of the information package at a computing device of an approver; and in response to receiving, via the computing device of the approver, a user indication to change the information package, generating an updated information package;

generating, based on the updated information package and after receipt of the user indication to change the information package, the first electronic message, the first electronic message comprising an indication of the set of documents; and transmitting the first electronic message to the recipient.

11. The computer-implemented method of claim 10, wherein storing the set of documents comprises encrypting the set of documents according to a set of encryption protocols.

12. The computer-implemented method of claim 11, wherein the set of documents is encrypted such that the set of documents is accessible upon verification by the recipient.

13. The computer-implemented method of claim 11, wherein the set of documents is encrypted such that the set of documents is accessible within a pre-determined time window.

14. The computer-implemented method of claim 10 further comprises:
obtaining a set of supplemental documents from an event administrator;
wherein the first electronic message further includes an indication of the set of supplemental documents.

15. The computer-implemented method of claim 10 further comprises:
obtaining a set of supplemental event instructions from an event administrator;
wherein the first electronic message further includes the supplemental event instructions.

16. The computer-implemented method of claim 10 further comprises:
obtaining a revised event date associated with the event;
in response to obtaining the revised event date, generating a set of revised documents based at least in part upon the revised event date;
storing the revised set of documents in the document platform;
generating a second electronic message including:
contact information determined according to the recipient information,
an indication of the revised set of documents, and
the set of event instructions; and
transmitting the second electronic message to the recipient.

17. The computer-implemented method of claim 10 further comprises generating the set of event instructions based at least in part upon the event type and the event date.

18. The computer-implemented method of claim 10, wherein transmitting the first electronic message to the recipient comprises obtaining a transmission instruction from an event administrator.

19. A system for secure document transfer comprising:
a processor; and
a memory storing instructions that, when executed by the processor, causes the system to perform a set of operations, the set of operations comprising:
obtaining an event date associated with an event of an event type;
generating, as part of an information package for the event type, a set of documents based at least in part upon the event date and the event type;
storing the set of documents in a document platform;
obtaining recipient information of a recipient associated with the event;
including, as part of the information package;
contact information determined according to the recipient information, and
a set of event instructions determined based at least in part upon the event type;
prior to transmission of a first electronic message, causing display of at least a part of the information package at a computing device of an approver; and
in response to receiving, via the computing device of the approver, a user indication to change the information package:
generating an updated information package;
generating, based on the updated information package, the first electronic message comprising a set of links for accessing the set of documents stored in the document platform; and
transmitting the first electronic message to the recipient.

20. The system of claim 19, wherein storing the set of documents comprises encrypting the set of documents according to a set of encryption protocols.

* * * * *